(12) United States Patent
Schichtel

(10) Patent No.: US 7,135,206 B2
(45) Date of Patent: Nov. 14, 2006

(54) COATED TITANIUM DIOXIDE PARTICLES

(75) Inventor: Martin Schichtel, Saarbrücken-Dudweiler (DE)

(73) Assignee: Leibniz-Institut Fuer Neue Materialien Gemeinnuetzige GmbH, Saarbruecken (DE)

( * ) Notice: Subject to any disclaimer, the term of this patent is extended or adjusted under 35 U.S.C. 154(b) by 278 days.

(21) Appl. No.: 10/493,062

(22) PCT Filed: Oct. 30, 2002

(86) PCT No.: PCT/EP02/12119

§ 371 (c)(1), (2), (4) Date: Apr. 29, 2004

(87) PCT Pub. No.: WO03/037994

PCT Pub. Date: May 8, 2003

(65) Prior Publication Data

US 2004/0265590 A1    Dec. 30, 2004

(30) Foreign Application Priority Data

Oct. 31, 2001   (DE)   ................... 101 53 640

(51) Int. Cl.
- *B05D 7/00*    (2006.01)
- *B32B 33/00*   (2006.01)
- *C01G 1/00*    (2006.01)
- *C01G 23/00*   (2006.01)
- *C04B 35/46*   (2006.01)

(52) U.S. Cl. ............... 427/212; 427/215; 427/219; 106/436; 106/438; 106/439; 106/442; 423/69; 423/274; 423/610; 428/403; 428/404; 977/773; 977/775; 977/776; 977/811

(58) Field of Classification Search ............ 423/274, 423/610, 69; 106/436, 442, 438, 439; 977/811, 977/773, 775, 776; 427/212, 215, 219; 428/403, 428/404

See application file for complete search history.

(56) References Cited

U.S. PATENT DOCUMENTS

| | | | | |
|---|---|---|---|---|
| 3,926,660 A | * | 12/1975 | Holle et al. | 106/430 |
| 4,461,810 A | * | 7/1984 | Jacobson | 428/530 |
| 5,137,575 A | | 8/1992 | Yasuki et al. | |
| 5,165,995 A | * | 11/1992 | Losoi | 428/403 |
| 5,536,448 A | | 7/1996 | Takahashi et al. | 252/520.1 |
| 6,090,373 A | * | 7/2000 | Oshima et al. | 424/59 |
| 6,956,006 B1 | * | 10/2005 | Mirsky et al. | 502/236 |

FOREIGN PATENT DOCUMENTS

| | | |
|---|---|---|
| DE | 19859852 | 6/1900 |
| EP | 0401045 | 12/1990 |
| FR | 2782520 | 2/2000 |
| GB | 1256421 | 12/1971 |

OTHER PUBLICATIONS

English translation of French Patent No. 2,782,520 A1 dated Feb. 25, 2000 to Enjalbert et al.*
English Language Abstract of FR 2782520.
English Language Abstract of DE 19859852.
D. N. Furlong et al., Journal of Colloid and Interface Science, 69(3), May 1979, pp. 409-419.
R. E. Day et al., Colloids and Surfaces, 23 (1987), pp. 137-155.

* cited by examiner

*Primary Examiner*—Timothy C. Vanoy
(74) *Attorney, Agent, or Firm*—Greenblum & Bernstein, P.L.C.

(57) ABSTRACT

A method for producing nanoscale titanium dioxide particles which are coated with an oxide, a hydroxide or an oxide hydroxide of Al, Ce, Zr and/or Si wherein the enzymatic precipitant system urease/urea is used. Said coated titanium dioxide particles can have an average size of less than 50 nm, the coating providing effective protection against photocatalytic reactions. The coated particles are suitable, in particular, as UV absorbers in a transparent organic matrix.

45 Claims, No Drawings

COATED TITANIUM DIOXIDE PARTICLES

CROSS-REFERENCE TO RELATED APPLICATIONS

The present application is a U.S. National Stage of International Application No. PCT/EP02/12119, filed Oct. 30, 2002, which claims priority under 35 U.S.C. § 119 of German Patent Application No. 101 53 640.2, filed Oct. 31, 2001.

BACKGROUND OF THE INVENTION

1. Field of the Invention

The present invention relates to a process for preparing nanoscale titanium dioxide particles coated with an oxide, hydroxide or oxide hydroxide of Al, Ce, Zr and/or Si, or a suspension thereof, and also to titanium dioxide particles obtainable therefrom which have an average particle diameter of below 50 nm.

2. Discussion of Background Information

Titanium dioxide powders are used on the industrial scale, for example as pigments or as UV absorbers. In order to be able to use titanium dioxide also in applications in which transparency is required, for example as a UV absorber in transparent layers, very fine particles are necessary. The preparation of very small particles having dimensions in the nanometer range is known. For instance, DE-A-198 59 852 describes a process for preparing a suspension of rutile particles whose number-average particle diameter is below 20 nm.

Titanium dioxide also has the property of being photocatalytically active. It can catalyze, for example, decomposition reactions under the action of light. Therefore, titanium dioxide particles generally cannot be embedded into a transparent organic matrix, since the matrix is destroyed by the photocatalytical effect under the action of light.

To prevent or reduce this effect, titanium dioxide particles may be coated or enrobed. The organic matrix may thus provide shielding from the processes responsible for the catalytic action. So that the coated titanium dioxide retains the desired functions such as UV absorption, the coating should be transparent for the appropriate light. In general, oxides of silicon, aluminum, zirconium or cerium are applied as the coating.

For example, D. N. Furlong, K. S. W. Sing and G. D. Parfitt in J. Coll. Interf. Sci, 1979, 69, 409 describe a coating process in which an acidic rutile suspension is admixed with sodium silicate and the suspension is then acidified, stirred and filtered. Coated particles of from 200 to 500 nm are obtained. According to R. E. Day, T. A. Eggerton, Coll. and Surf., 23, 1987, 137, coating is effected by adding aluminum sulfate to an acidic suspension of rutile particles, neutralizing with a base such as ammonia or sodium hydroxide solution, filtering and drying.

However, all known processes for particles in the nanoscale range lead only to irregular coatings having nonuniform thickness. When there are coating sites with too low a thickness or uncovered sites, screening and thus prevention or reduction of the photocatalytic effect is no longer ensured. On the other hand, when a larger amount of coating material is used, this results in agglomeration or aggregation of the particles. For example, aggregates of particles are formed which are joined together by the coating composition. Coated titanium dioxide particles having dimensions which are required in transparent applications cannot be prepared according to the prior art, since coated titanium dioxide particles according to the prior art have an average particle diameter of above 150 nm.

It is therefore an object of the present invention to provide a process for coating nanoscale titanium dioxide particles by which coated titanium dioxide particles having a number-average particle size of below 50 nm and less may obtain effective protection with respect to photocatalysis, in order to be able to use titanium dioxide particles for transparent applications in an organic matrix. For this purpose, uniform coating is required.

SUMMARY OF THE INVENTION

The present invention provides a process for preparing (hydr)oxide-coated nanoscale titanium dioxide particles. This process comprises contacting the titanium dioxide particles in a suspension thereof with one or more compounds of Al, Ce, Zr and/or Si in the presence of urea and urease and under conditions which result in a precipitation of an oxide, hydroxide and/or oxide hydroxide of Al, Ce, Zr and/or Si on the surface of the titanium dioxide particles.

In one aspect of this process, the conditions which result in a precipitation preferably comprise a pH of at least 4.

In another aspect of the process, the suspension may comprise water.

In yet another aspect, the titanium dioxide particles may have a number-average diameter of below 100 nm, for example, below 50 nm, or below 30 nm.

In yet another aspect of the process of the present invention, the titanium dioxide particles may comprise surface-modified particles, for example, particles which are surface-modified with a diphosphate, a polyphosphate, polyvinyl alcohol, polyvinylpyrrolidone and/or a methyl vinyl ether-maleic anhydride copolymer, preferably particles which are surface-modified with polyvinyl alcohol. The surface-modified particles comprise preferably from 0.1% to 10% by weight of a surface-modifying agent.

In a still further aspect of the process of the present invention, the titanium dioxide particles may comprise anatase and/or rutile particles, preferably at least rutile particles.

In another aspect of the process, the one or more compounds may comprise at least one of a nitrate, sulfate, halide, hydrogen phosphate and phosphate of one or more or Al, Ce, Zr and Si, for example, aluminum sulfate, aluminum chloride and/or cerium chloride, preferably, aluminum sulfate.

In yet another aspect, the process may be carried out at a pH of from 4 to 9 and/or at room temperature, e.g., at about 25° C.

In another aspect of the process, from 20 to 100 parts by weight of urea may be used per 1 part by weight of urease.

In another aspect, the precipitation may result in from 0.1% to 10% by weight, for example, 3% to 10% by weight, or 5% to 10% by weight, of a coating on the titanium dioxide particles.

In another aspect, the process may further comprise a hydrothermal treatment of the coated titanium dioxide particles and/or a recovery of the coated titanium dioxide particles from the suspension.

The present invention also provides (hydr)oxide-coated nanoscale titanium dioxide particles. These particles are provided with a coating which comprises an oxide, hydroxide and/or oxide hydroxide of one or more of Al, Ce, Zr and Si and have a number-average diameter of below 50 nm.

In one aspect, the particles preferably have a number-average diameter of below 40 nm, e.g., below 30 nm.

In another aspect, the particles may comprise anatase and/or rutile, preferably rutile.

In yet another aspect, the coating may comprise Al, for example aluminum oxide and/or aluminum hydroxide, preferably, boehmite.

In a still further aspect, the particles may comprise from 0.1% to 10% by weight of the coating, based on the titanium dioxide, e.g., at least 3%, preferably, at least 5% by weight.

In yet another aspect, the coating preferably has a substantially uniform thickness.

In another aspect, the particles may have been subjected to a modification with a surface-modifying agent prior to being coated. For example, the particles may comprise from 0.1% to 10% by weight of a surface-modifying agent. The surface-modifying agent may, for example, comprise one or more of a diphosphate, a polyphosphate, polyvinyl alcohol, polyvinylpyrrolidone and a methyl vinyl ether-maleic anhydride copolymer. Polyvinyl alcohol is a preferred surface-modifying agent.

The present invention also provides a (preferably aqueous) suspension which comprises the particles set forth above, including the various aspects thereof.

The present invention further provides a transparent shaped body which comprises the particles of the present invention, as well as an article provided with a transparent coating, said coating comprising these particles.

The present invention also provides a method of reducing or eliminating the photocatalytic activity of nanoscale titanium dioxide particles. This method comprises providing titanium dioxide particles having a number-average diameter of below 50 nm with a coating. The coating comprises an oxide, hydroxide and/or oxide hydroxide of one or more of Al, Ce, Zr and Si, has a substantially uniform thickness and is present in a concentration of from 0.1% to 10% by weight, based on the titanium dioxide particles.

As stated above, one object of the present invention is the provision of nanoscale titanium dioxide particles which can be used in a transparent organic matrix.

This object is achieved in accordance with the invention by a process for preparing nanoscale titanium dioxide particles coated with an oxide, hydroxide or oxide hydroxide of Al, Ce, Zr and/or Si, or a suspension thereof, by precipitating one or more compounds of Al, Ce, Zr and/or Si or mixtures thereof, as a precursor of the coating material, in a suspension of the titanium dioxide particles which have optionally been surface-modified, with urease and urea as an enzymatic precipitant system to form a coating composed of an oxide, hydroxide or oxide hydroxide of Al, Ce, Zr and/or Si on the titanium dioxide particles, then optionally hydrothermally treating the suspension and optionally removing the coated titanium dioxide particles formed from the suspension.

The process according to the invention for the first time allows preparation of appropriately coated titanium dioxide particles having an average particle size of below 50 nm and less, so that these particles likewise form part of the subject matter of the present invention. The process according to the invention allows regularly coated titanium dioxide particles, i.e. having substantially uniform coating thickness, to be obtained.

Titanium dioxide occurs as brookite, anatase and rutile. For this invention, anatase and especially rutile are preferred. For the process according to the invention, suspensions of nanoscale titanium dioxide particles are used. These are in particular aqueous suspensions. If desired, an organic solvent such as an alcohol may be added to the water which is preferred as a suspension agent. However, this is not preferred.

The nanoscale particles in particular have a number-average particle size or a number-average particle diameter of below 100 nm, preferably below 30 nm and more preferably below 20 nm or even below 10 nm. Unless stated otherwise, the data on the average particle size (on the average particle diameter) of the particles and of the coated particles relate here and hereinbelow to the number average ($d_{50}$ value), there being no distinction between primary particles and secondary particles (agglomerates). The particle size may be determined by light scattering, for example by laser light backscattering. The primary particle size of the particles can be determined, for example, by X-ray diffractometry.

Particular preference is given to using suspensions of titanium dioxide particles which can be prepared by the process of DE-A-198 59 852. In this process, aqueous suspensions of rutile particles are obtained preferably by introducing finely divided titanium tetrachloride into hydrochloric acid. For this purpose, liquid titanium tetrachloride is introduced as an atomized aerosol in hydrochloric acid. For this dispersion, a two-substance nozzle such as a crossflow atomizer, a hollow-cone nozzle or an ultrasound atomizer may be used. The resulting solution is preferably subjected to heat treatment. Suspensions are obtained which comprise rutile particles having a number-average particle diameter of below 20 nm.

To stabilize the titanium dioxide particles with regard to pH ranges which are appropriate in the process according to the invention, particular preference is given to surface-modifying the titanium dioxide particles before the coating process. The surface modification may be carried out by the customary prior art processes. Suitable surface-modifying agents are, for example, diphosphates, polyphosphates, polyvinyl alcohol such as Mowiol® from BASF, e.g. Mowiol 4/88, polyvinylpyrrolidone and methyl vinyl ether-maleic anhydride copolymers such as Gantrez® AN copolymers from Ciba. A preferred surface-modifying agent is polyvinyl alcohol.

The surface is typically modified by adding the surface-modifying agent to the aqueous suspension of the titanium dioxide particles, stirring for a certain time, so that the surface-modifying agent is adsorbed, and removing the surface-modifying particles, for example by filtering. The stirring process may be effected at room temperature or close to it, e.g. at from 15 to 40° C., and over a period of from 1 h to 48 h or from 3 h to 10 h. The suspension used may be, for example, a from 0.1 to 10% by weight titanium dioxide particle suspension. The surface-modifying agent is used, for example, in an amount of from 0.1 to 10% by weight based on the titanium dioxide particles.

Compounds suitable as one or more compounds of Al, Ce, Zr or Si which are used as the precursor of the coating material are all compounds with which hydroxides, oxides or oxide hydroxides of Al, Ce, Zr and/or Si may be precipitated. Mixtures of compounds may be used, although particular preference is given to using only one compound. The compounds are added to the suspension of the titanium dioxide particles. The compounds are preferably initially dispersed or preferably dissolved in water and this solution or dispersion is then added to the suspension of the titanium dioxide particles.

The compounds or salts are preferably nitrates, sulfates, halides (e.g. chloride or bromide), dihydrogenphosphates, hydrogenphosphates or phosphates, of Al, Ce, Zr (or $ZrO^{2+}$) or Si, and particular preference is given to aluminum salts. However, they may also be salts of silicic acid such as sodium or potassium silicate (waterglass), or salts of aluminates, e.g. sodium or potassium aluminates. The compounds used may be hydrated or anhydrous.

Specific examples are aluminum sulfate such as $Al_2(SO_4)_3 \cdot 16H_2O$, aluminum chloride such as $AlCl_3 \cdot 6H_2O$, aluminum nitrate such as $Al(NO_3)_3 \cdot 9H_2O$, aluminum phosphates such as $A(H_2PO_4)_3$, sodium silicate, $ZrO(NO_3)_2$, $ZrCl_4$, $CeCl_3$ or cerium sulfate such as $Ce(SO_4)_2 \cdot 4H_2O$. Particular preference is given to aluminum sulfate, aluminum chloride and cerium chloride, very particular preference to aluminum sulfate.

Preference is given to compounds of Al, Ce, Zr or Si which are water-soluble under acidic conditions, i.e. exhibit no precipitates in aqueous solution at a pH below 4. Preference is further given to compounds whose precipitation (of the hydroxides/oxides) can be completed at a pH of not more than 9. In other words, the precipitation range of the compound used should be within the pH range from 4 to 9.

To carry out the precipitation, an enzymatic precipitant system is used, specifically a combination of urease and urea. Above a pH of about 4, the enzyme is capable of releasing ammonia from the urea and thus of raising the pH. The increase in the pH induces the precipitation. The precipitation may be commenced by, for example, raising the pH of an aqueous suspension which comprises all constituents, i.e. optionally surface-modified titanium dioxide particles, the dissolved Al, Ce, Zr or Si compound and the precipitant system, to a pH of 4 or higher by adding a base such as ammonia, or adding to the otherwise complete suspension which has been adjusted to a pH of 4 or higher a component of the precipitant system (urease or urea) which is still absent.

The precipitation parameters such as reaction time, controllability of the pH and final pH can be efficiently adjusted in the urease/urea system. The pH of the suspension at the start of the precipitation process is preferably about 4. It is appropriate to work at about room temperature, preference being given to a temperature of approx. 25° C. The duration of the precipitation can be adjusted, for example, to from 30 s to 1 h by the ratio of the amount of urease to urea. It is appropriate to use from 1 to 5 g of urea per 0.05 g of urease. The final pH to be attained can be adjusted by the concentration of urease. The amount of urea is selected in such a way that, when the suitable amount of urease is present, sufficient ammonia is released in order to attain the desired final pH.

The precipitation may lead directly or in some cases after a heat treatment to a crystalline coating. In the case of the precipitation of $CeCl_3$, for example, crystalline cerium oxide is formed directly as a coating. In that case, there is no need for a heat treatment. However, especially in the case of Al compounds, an amorphous, in some cases water-containing hydroxide coating is usually obtained. After the precipitation, a heat treatment is therefore preferably effected, and especially a hydrothermal treatment of the resulting suspension, in particular when an amorphous coating has formed after the precipitation.

A hydrothermal treatment refers to a heat treatment of an aqueous solution or suspension under pressure, for example at a temperature of above 100° C. and a pressure of above 1 bar. This precipitation allows the precipitated hydroxide, oxide or oxide hydroxide to be converted to the desired modification. The suitable conditions can be determined, for example, from a phase diagram. To form boehmite from precipitated, amorphous aluminum hydroxide, for example, a hydrothermal treatment at about 210° C. and about 30 bar over about 6 h is suitable.

An oxide, hydroxide or oxide hydroxide of Al, Ce, Zr and/or Si refers to the oxygen compounds in the possible oxidation states of the elements. The oxide hydroxides also refer in particular to all transition states between the oxides and hydroxides. Oxide hydroxides are sometimes also referred to as metahydroxides. For instance, boehmite (AlO(OH)) is also called aluminum metahydroxide. It will be appreciated that impurities, for example counterions from the compounds used for the precursor, water molecules, etc. may also be present.

After the hydrothermal treatment, the substantially crystalline oxide or oxide hydroxide of the elements mentioned is preferably obtained. The hydrothermal treatment generally leads to compaction and "dewatering" of the amorphous layer to form crystalline modifications of the oxides or oxide hydroxides. Particular preference is given to a coating of boehmite (crystalline AlO(OH)).

The coated particles may be used in the form of the suspension. The suspension may also be concentrated by evaporation. The coated particles may also be isolated as a powder, for example by evaporating off the water or filtering and drying.

Simplified theoretical considerations can be used to determine the approximate amount of coating material required in order to coat the surface of the particles with a monomolecular layer. In general, the amount of Al, Si, Ce and/or Zr compound is selected in such a way that a coating, for example a boehmite coating, of from 0.1% by weight to 10% by weight, preferably from 3% by weight to 10% by weight, more preferably from 5% by weight to 10% by weight, based on titanium dioxide, is obtained, from which, assuming. uniform coating, coating thicknesses of from 0.2 to 1.2 nm can be calculated. The number-average particle size of the coated particles is preferably below 50 nm.

For the protection of the matrix from decomposition reactions, a degree of coverage of the particles by the coating of 100% is ideal. However, effective protection can also be obtained when the freely accessible titanium dioxide surface is only joined to the matrix by very small pores and channels. For from 0.1% by weight to 10% by weight boehmite coating based on the titanium dioxide particles, a degree of coverage of from 0.97 to 1.25 can be calculated, i.e. for 0.1% by weight coating, 3% of the surface is still uncovered.

The coating obtained in accordance with the invention is so uniform that even a 0.1% by weight coating (theoretical degree of coverage 0.97) achieves noticeable protection from photocatalytic activity. Even from a coating of 5% by weight based on the titanium dioxide particles, there is virtually complete protection with respect to photocatalytic activity, so that such particles, disregarding any nontroublesome pores or channels, are fully enrobed by the coating. The pores or channels which are present are too small to enable the contact of the reaction partners required for photocatalysis. The practically calculated coverage thus almost corresponds to the theory, which leads to the conclusion that a very uniform coating is obtained in accordance with the invention.

In the process according to the invention, particles having a coating of from 0.1 to 10% by weight based on titanium dioxide are obtained which have a number-average diameter of below 50 nm and even below 40 nm, for example from 20 to 50 and in particular from 30 to 40 nm, so that they are also suitable for transparent applications. The coated particles are therefore especially suitable as UV absorbers for a transparent organic matrix.

DETAILED DESCRIPTION OF THE INVENTION

The examples which follow illustrate the invention without restricting it.

EXAMPLE 1

The particles are prepared by the process described in DE-A-198 59 852. A crossflow atomizer is introduced into a 500 ml flat-flange vessel which contains 100 ml of deionized water which has been adjusted to a pH of 2 using HCl. The atomizer is disposed above the water surface. 5 ml of titanium tetrachloride are introduced under inert gas into a measuring cylinder protected from atmospheric moisture. The titanium tetrachloride is transported into the atomizer nozzle at a rate of 10 ml/h using a peristaltic pump. There, it meets dry air at a pressure of approx. 3 bar. This atomizes titanium tetrachloride in the flat-flange vessel and disperses it in the initially charged water. The resulting suspension of the particles may be used without further processing, after concentration or after full evaporation to form a powder. This provides redispersable rutile particles having a number-average diameter $d_{50}$ of below 10 nm (approx. 6 nm)

1 g of the resulting n-rutile particles is dispersed in 100 ml of deionized water. The suspension is admixed with 1% by weight of PVA (Mowiol® 4/88) based on the rutile and stirred for 30 min. In a second vessel, 0.26 g (0.42 mmol) of $Al_2(SO_4)_3 \cdot 16H_2O$ is dissolved in 10 ml of deionized water and admixed with 0.05 g of urease. This solution is titrated to the rutile suspension, in the course of which the pH is kept at 4.5 using a 20% ammonia solution. Then, 5.0 g (0.083 mol) of urea are added. After 30 min, this results in a pH of from approx. 8 to 8.5. The suspension is aftertreated in a pressure digester at 220° C. for 6 h. The hydrothermal treatment converts the amorphous hydroxide coating to a crystalline phase, boehmite.

The particle size and its distribution are determined using an ultrafine particle analyzer from Grimm Labortechnik GmbH which works with laser beam diffraction and reflection and has a measuring range of from 3 nm to 6 µm. A number-average diameter of 35 nm is obtained. The fraction of the boehmite coating is about 5% by weight based on rutile. The relative degree of coverage is 1.18. HTEM images give an average coating thickness of 0.7 nm.

EXAMPLE 2

The procedure of Example 1 is repeated, except that 0.58 mmol of $CeCl_3$ is used instead of aluminum sulfate. Without hydrothermal treatment, rutile particles are obtained which are coated with crystalline cerium oxide.

EXAMPLE 3

The procedure of Example 1 is repeated, except that 0.010, 0.040, 0.085, 0.415 and 0.835 mol respectively of $Al_2(SO_4)_3 \cdot 16H_2O$ are used, so that a boehmite coating of 0.1, 0.5, 1.0, 5.0 and 10.0% by weight respectively based on rutile is obtained. In all samples, average diameters below 50 nm are obtained for the coated particles. The photocatalytic activity of the coated particles is compared with that of the uncoated particles. For this purpose, the photocatalytic degradation of murexide by the particular particles is determined in the UV/VIS spectrum.

While murexide is completely destroyed within 60 min by uncoated rutile in the experimental setup selected, in the case of 0.1 and 1% by weight of boehmite coating after 120 min, only 70 and 30% respectively of murexide is destroyed, so that even here there is noticeable protection. At 5 and 10% by weight of boehmite coating, no degradation of the dye can be detected after 120 min.

What is claimed is:

1. A process for preparing (hydr)oxide-coated nanoscale titanium dioxide particles, wherein the process comprises contacting the titanium dioxide particles in a suspension thereof with one or more compounds of at least one of Al, Ce, Zr and Si in the presence of urea and urease and under conditions which result in a precipitation of at least one of an oxide, hydroxide and oxide hydroxide of one or more of Al, Ce, Zr and Si on the surface of the titanium dioxide particles.

2. The process of claim 1, wherein the conditions which result in a precipitation comprise a pH of at least 4.

3. The process of claim 2, wherein the suspension comprises water.

4. The process of claim 3, wherein the titanium dioxide particles have a number-average diameter of below 30 nm.

5. The process of claim 4, wherein the precipitation results in from 5% to 10% by weight of a coating on the titanium dioxide particles.

6. The process of claim 3, wherein the titanium dioxide particles have a number-average diameter of below 40 nm.

7. The process of claim 2, wherein the titanium dioxide particles have a number-average diameter of below 50 nm.

8. The process of claim 7, wherein the titanium dioxide particles comprise rutile.

9. The process of claim 7, wherein the precipitation results in from 3% to 10% by weight of a coating on the titanium dioxide particles.

10. The process of claim 1, wherein the titanium dioxide particles have a number-average diameter of below 100 nm.

11. The process of claim 1, wherein the titanium dioxide particles comprise surface-modified particles.

12. The process of claim 11, wherein the surface-modified particles comprise particles surface-modified with at least one of a diphosphate, a polyphosphate, polyvinyl alcohol, polyvinylpyrrolidone and a methyl vinyl ether-maleic anhydride copolymer.

13. The process of claim 12, wherein the surface-modified particles comprise from 0.1% to 10% by weight of at least one surface-modifying agent.

14. The process of claim 11, wherein the surface-modified particles comprise particles which are surface-modified with polyvinyl alcohol.

15. The process of claim 1, wherein the titanium dioxide particles comprise at least one of anatase and rutile.

16. The process of claim 15, wherein the one or more compounds comprise aluminum sulfate.

17. The process of claim 1, wherein the one or more compounds comprise at least one of a nitrate, sulfate, halide, hydrogen phosphate and phosphate of one or more or Al, Ce, Zr and Si.

18. The process of claim 17, wherein the one or more compounds comprise at least one of aluminum sulfate, aluminum chloride and cerium chloride.

19. The process of claim 17, wherein the one or more compounds comprise aluminum.

20. The process of claim 1, wherein the process is carried out at a pH of from 4 to 9.

21. The process of claim 1, wherein the process is carried out at room temperature.

22. The process of claim 1, wherein the process is carried out at about 25° C.

23. The process of claim 1, wherein from 20 to 100 parts by weight of urea are used per 1 part by weight of urease.

24. The process of claim 1, wherein the precipitation results in from 0.1% to 10% by weight of a coating on the titanium dioxide particles.

25. The process of claim 24, wherein the coating comprises at least one of aluminum oxide and aluminum hydroxide.

26. The process of claim 25, wherein the coating consists essentially of boehmite.

27. The process of claim 24, wherein the coating has a substantially uniform thickness.

28. The process of claim 1, which further comprises a hydrothermal treatment of the coated titanium dioxide particles.

29. The process of claim 1, which further comprises recovering the coated titanium dioxide particles from the suspension.

30. A process for preparing (hydr)oxide-coated titanium dioxide particles, wherein the process comprises contacting titanium dioxide particles which comprise at least one of anatase and rutile and have a number-average diameter of below 50 nm in an aqueous suspension thereof with at least one compound selected from nitrates, sulfates, halides, hydrogen phosphates and phosphates of one or more or Al, Ce, Zr and Si in the presence of urea and urease and under conditions which result in a precipitation of at least one of an oxide, hydroxide and oxide hydroxide of one or more of Al, Ce, Zr and Si on the surface of the titanium dioxide particles.

31. The process of claim 30, wherein the conditions which result in a precipitation comprise a pH of at least 4.

32. The process of claim 30, wherein the titanium dioxide particles have a number-average diameter of below 30 nm.

33. The process of claim 30, wherein the titanium dioxide particles comprise surface-modified particles.

34. The process of claim 33, wherein the surface-modified particles comprise particles surface-modified with at least one of a diphosphate, a polyphosphate, polyvinyl alcohol, polyvinylpyrrolidone and a methyl vinyl ether-maleic anhydride copolymer.

35. The process of claim 33, wherein the surface-modified particles comprise from 0.1% to 10% by weight of at least one surface-modifying agent.

36. The process of claim 30, wherein the at least one compound comprises at least one of aluminum sulfate, aluminum chloride and cerium chloride.

37. The process of claim 36, wherein the process is carried out at a pH of from 4 to 9.

38. The process of claim 37, wherein the process is carried out at room temperature.

39. The process of claim 30, wherein from 20 to 100 parts by weight of urea are used per 1 part by weight of urease.

40. The process of claim 30, wherein the precipitation results in from 3% to 10% by weight of a coating on the titanium dioxide particles.

41. The process of claim 40, wherein the coating comprises at least one of aluminum oxide and aluminum hydroxide.

42. The process of claim 40, wherein the coating consists essentially of boehmite.

43. A process for preparing (hydr)oxide-coated titanium dioxide particles, wherein the process comprises contacting surface-modified titanium dioxide particles which comprise rutile and have a number-average diameter of below 30 nm in an aqueous suspension thereof with at least one compound selected from aluminum sulfate, aluminum chloride and cerium chloride in the presence of urea and urease and under conditions which result in a precipitation of at least one of an oxide, hydroxide and oxide hydroxide of at least one of Al and Ce on the surface of the titanium dioxide particles.

44. The process of claim 43, wherein the process is carried out at a pH of from 4 to 9.

45. The process of claim 44, wherein from 20 to 100 parts by weight of urea are used per 1 part by weight of urease.

* * * * *